United States Patent Office 3,517,084
Patented June 23, 1970

3,517,084
GRAFT COPOLYMERS WITH A BACKBONE OF AN ACRYLIC ESTER AND BENZYL ACRYLATE
Pierre Tellier and Edouard Grimaud, Oullins, France, assignors to Ugine Kuhlmann, Paris, France, a French company
No Drawing. Filed Apr. 10, 1968, Ser. No. 720,405
Claims priority, application France, Apr. 10, 1967, 102,080; Apr. 17, 1967, 102,931
Int. Cl. C08f 15/18, 15/40, 19/10
U.S. Cl. 260—881
15 Claims

ABSTRACT OF THE DISCLOSURE

A graft copolymer is produced by grafting (a) a polymer of 70 to 100 parts by weight of methyl methacrylate copolymerized with 0 to 30 parts by weight of one or more copolymerizable monomers or (b) a polymer of 60 to 100 parts by weight of at least one vinyl aromatic monomer copolymerized with 0 to 40 parts by weight of at least one ethylenic nitrile, the amount of the vinyl aromatic monomer and the ethylenic nitrile in the polymer being 100 parts by weight and with 0 to 30 parts by weight of one or more copolymerizable monomers on an interpolymeric chain of 80 to 99 parts by weight of at least one acrylic ester of a lower aliphatic alcohol having 1 to 8 carbon atoms polymerized with 1 to 20 parts by weight of at least one ester having the following formula

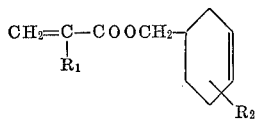

wherein $R_1$ and $R_2$ each is a hydrogen atom or a methyl group, in the interpolymeric chain the combination of the acrylic ester and the cyclic ester being 100 parts by weight, and with 0 to 30 parts by weight of one or more copolymerizable monomers. The interpolymeric chain which forms the backbone is 5 to 75% by weight of the graft copolymer.

BACKGROUND OF THE INVENTION

Field of the invention

This invention relates to graft copolymer and, more particularly, to graft copolymer which has an interpolymeric chain as its backbone derived from acrylic ester of a lower aliphatic alcohol and acrylic or methacrylic ester of tetrahydrobenzyl alcohol.

Description of the prior art

Impact strength of a resin has been improved by interpolymerizing the resin with an elastomer of butadiene or, better, by graft copolymerizing the resin onto the elastomer of butadiene. Thus polystyrene and polyacrylonitrile have been reinforced by graft polymerizing these two polymers onto polybutadiene. These graft copolymers are known as the ABS resins which possess satisfactory mechanical properties and particularly high impact strength.

However, ABS resins age rapidly when they are exposed to light and heat partially losing their desirable properties.

It has also been suggested to graft methyl methacrylate alone or contingently with another copolymerizable monomer onto polybutadiene to improve the impact strength of the widely used polymers of methyl methacrylate. It has been shown that polymeric compositions retain the transparency of the polymethyl methacrylate with improved impact strength by grafting in appropriate proportion a mixture of methyl methacrylate and styrene onto polybutadiene or a copolymer of butadiene. These compositions are known as MBS and have the similar drawback as the ABS resins.

The aging of ABS and MBS is caused primarily by the sensitivity to oxidation of the double bond $>C=C<$ in the polybutadiene chain. To overcome this deficiency, it has been suggested to replace the polybutadiene component with copolymers of ethylene and propylene or with polyacrylates. The resultant resins however have relatively low impact strength due to the lack of grafting points in the backbone polymeric chains. Higher impact strength could be obtained, heretofore, by the relatively costly processes of irradiation and peroxydation to create grafting points for the preparation of graft copolymers of this type.

SUMMARY OF THE INVENTION

We have discovered that graft copolymer with satisfactory impact strength and much greater resistance to aging than those of the ABS and MBS resins can be obtained by using as the backbone of the graft copolymer an interpolymer of (a) 80 to 99 parts by weight of at least one acrylic ester of a lower aliphatic alcohol having 1 to 8 carbon atoms polymerized with (b) 1 to 20 parts by weight of at least one ester having the following formula

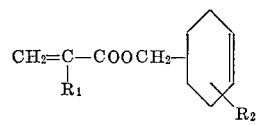

wherein $R_1$ and $R_2$ each is a hydrogen atom or a methyl group, in the interpolymeric chain the combination of (a) and (b) being 100 parts by weight, and with (c) 0 to 30 parts by weight of one or more copolymerizable monomers.

The side polymeric chains grafted to the interpolymeric chain comprise polymerized linkages of (d) 70 to 100 parts by weight of methyl methacrylate which may be copolymerized with 0 to 30 parts by weight of one or more copolymerizable monomers, or polymerized linkages of (f) 60 to 100 parts by weight of at least one vinyl aromatic monomer which may be copolymerized with (g) 0 to 40 parts by weight of at least one ethylenic nitrile, the amount of (f) and (g) in the polymeric linkage being 100 parts by weight and with (h) 0 to 30 parts by weight of one or more copolymerizable monomers. The interpolymeric chain which forms the backbone is 5 to 75% by weight of the graft copolymer.

DESCRIPTION OF THE PREFERRED EMBODIMENTS

The acrylic esters suitable for the use as a major component of the interpolymeric chain which forms the backbone of the graft copolymer include acrylic esters of methyl, ethyl, butyl, 2-ethyl hexyl and heptyl alcohols. One or more of these acrylic esters are preferably polymerized with at least one cyclic ester of the formula

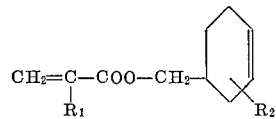

wherein $R_1$ and $R_2$ each is a hydrogen atom or a methyl group with a weight ratio stated hereinabove. The preferred cyclic esters are acrylic and methacrylic esters of tetrahydrobenzyl alcohol (3-cyclohexenyl-1-methyl acrylate or methacrylate).

Other monomers which can be copolymerized with the esters can be used up to 30% by weight of the total acrylic and cyclic esters to form the backbone interpolymeric chain for the graft copolymer. Suitable monomers include acrylonitrile, methacrylonitrile, methylene glutaronitrile, styrene, vinyl esters of saturated aliphatic acids having 1 to 18 carbon atoms, vinyl and alkyl ethers whose alkyl moiety contains 1 to 18 carbon atoms, allyl acrylate, allyl methacrylate and divinyl benzene. The alkyl moiety of the alkyl ethers and of the saturated aliphatic acids may be typically straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc.

The interpolymer of the aforesaid components upon which the grafting is to be carried out can be prepared in accordance with conventional polymerization techniques. We found emulsion polymerization which leads to a final product in the form of a latex to be particularly suitable. The polymerization can be carried out over wide temperature limits. Generally, a temperature in the range of 0° to 100° C. is suitable.

Once the backbone interpolymer is formed, the grafting reaction may be performed in accordance with known techniques such as by mass polymerization or by suspension polymerization. The preferred method involves the dissolution of the interpolymer into monomer or a mixture of monomers used to graft onto the interpolymeric chain and thereafter the graft copolymerization of the monomeric and polymeric mixture is performed with or without initiator. It is also suitable to carry out the graft copolymerization in a homogeneous mixture by operating in a manner which causes the particles of the interpolymer to agglomerate within the homogeneous mixture before the actual grafting were to begin. If the graft copolymerization were carried out by an emulsion polymerization reaction, good results can be obtained when the polyacrylic and polycyclic esters possess large particle size.

The monomer or the mixture of monomers suitable for the grafting as stated above are (a) methyl methacrylate which may be copolymerized with up to 30% by weight of one or more copolymerizable monomers to form the grafted side chains, and (b) vinyl aromatic monomer copolymerized with up to 40% by weight of ethylenic nitrile. An addition of up to 30% by weight of the total amount of vinyl aromatic monomer and ethylenic nitrile of one or more copolymerizable monomers can also be used for grafting. The monomers suitable for copolymerization with methyl methacrylate include styrene, α-methyl styrene, acrylonitrile, methacrylonitrile, methylene glutaronitrile, methyl acrylate and acrylic and methacrylic esters of ethyl, butyl, 2-ethyl hexyl and heptyl alcohols.

In the (b) monomeric system the vinyl aromatic monomers suitable for the invention include α-methyl styrene, halogenated styrene and alkylated styrene. These styrenes are available commercially and any degree of halogenation or alkylation necessary to modify the styrene monomer for commercial application can be used in the present invention. It is preferred that lower alkyl compounds, i.e., containing not more than 8 carbon atoms are used for the alkylation.

Advantageously, the vinyl aromatic monomer is copolymerized with ethylenic nitrile to form the side chain of the graft copolymer. Generally up to 40% of the combined weight of vinyl aromatic monomer or monomers and ethylenic nitrile is issued. The suitable ethylenic nitrile includes acrylonitrile, methacrylonitrile and methylene glutaronitrile. Optionally up to 30% of the combined weight of vinyl aromatic monomers and ethylenic nitrile of one or more copolymerizable monomers including acrylic and methacrylic esters of methyl, ethyl, butyl, 2-ethyl, hexyl and heptyl alcohols can be used to copolymerize therewith.

If an initiator were used for the graft copolymerization, we prefer to use peroxides or azo compounds. Suitable peroxides include organic peroxides and hydroperoxides such as lauroyl peroxide, benzoyl peroxide and cumene hydroperoxide. The per-salts such as potassium persulfate and hydrogenperoxide may also be used. Among the azo compounds that we found to be eminently suitable is azo-bisisobutyronitrile. Redox systems such as potassium persulfate and sodium bisulfate which may or may not be activated by ferrous or cupric salts may be also used advantageously as initiators.

Conventional regulators such as dodecyl mercaptan may be added to regulate the molecular weight. The graft copolymerization is preferably carried out at a pH in the range between 2 and 10.

In the case of emulsion polymerization, anionic, non-ionic or cationic compounds may be employed as emulsifiers. The alkyl sulfates of alkaline metals as well as the alkyl aryl sulphonates and the alkaline salts of disproportioned acids are among the suitable emulsifiers for the process of this invention. The reaction products of ethylene oxide and phenols, fatty alcohols and fatty acids which are non-ionic emulsifiers are also suitable for graft copolymerization.

The resultant graft copolymer may be used alone for molding such as by extrusion molding or used in combination with one or more polymers such as polystyrene, poly-α-methyl styrene, polyacrylonitrile, polymethyl methacrylate, polyacrylates or their copolymers. A variety of adjuvants such as lubricants, stabilizers, plasticizers, pigments and dyes may be added to the graft copolymer of this invention. It should be pointed out that the graft copolymer of this invention is prepared by using the cyclic double bonds carried by the interpolymeric chain as grafting points; hence the resultant graft copolymer has unusual resistance to aging due to the fact that the grafting points are not integrated into the interpolymeric chain.

Further to illustrate this invention, specific examples are described hereinbelow.

EXAMPLE 1

Preparation of copolymer of ethyl acrylate and tetrahydrobenzyl acrylate in an emulsion The copolymer was prepared from the following reactants:

|  | G. |
|---|---|
| Ethyl acrylate | 384 |
| Tetrahydrobenzyl acrylate | 16 |
| Water | 560 |
| Sodium laurylsulphate | 4 |
| Monohydrated monosodium phosphate | 2 |
| Potassium persulphate | 0.24 |
| Sodium bisulphite | 0.12 |
| Heptahydrated ferrous sulphate | 0.01 |

345 cc. of water and the monosodium phosphate were introduced into a 2 liter flask kept at 20° C. surmounted by two dropping funnels and equipped with a stirring mechanism, a nitrogen feed and a temperature gauge. One of the dropping funnels was filled with the monomers and the other with a solution of 4 g. of sodium lauryl sulphate in 200 cc. of water. After scavenging the flask with a flow of nitrogen, 30 cc. of the lauryl sulphate solution was poured thereinto and thereafter the persulphate, the bisulphite and the ferrous sulphate were introduced in the form of freshly prepared solutions (5 cc. of each solution). Immediately afterwards, the monomers and the remainder of the lauryl sulphate solution were poured into the flask continuously and simultaneously at a speed such that the internal temperature of the flask, which changed according to the reaction was maintained at 25° C. The pouring operation lasted approximately one and a half hours and the flask was kept at 25° C. for another three hours. The yield of polymerization was 98.5%.

A part of the dispersion obtained was kept to produce the graft copolymer of Example 4, the rest was coagulated by means of an aqueous solution containing 0.5% by weight of calcium chloride. The polymer was collected in the form of white crumbs which were washed abundantly with water, drained and dried under reduced pressure at 60°. The intrinsic viscosity in benzene at 25° C. of the copolymer obtained amounts to 1.286 dl./g. This copolymer was used to produce the graft copolymer of Example 2.

EXAMPLE 2

Preparation of a graft copolymer by grafting styrene and acrylonitrile onto the ethyl acrylate and tetrahydrobenzyl acrylate copolymer in suspension.

The following solution was introduced into a 2 liter glass reactor kept at 90° C., surmounted by a dropping funnel, a cooler and equipped with a stirring mechanism and a nitrogen feed:

Water—1000 g.
Polyvinyl alcohol—5 g. (in the form of Rhodoviol 25/100 M of Societe des Usines Chimiques Rhone Poulenc).

The solution was brought to 70° C. and de-aerated by means of bubbling nitrogen. Whilst stirring, a separately produced solution containing:

| | G. |
|---|---|
| Elastomer of Example 1 | 75 |
| Styrene | 293 |
| Acrylonitrile | 132 |
| Tertio dodecyl mercaptan | 0.5 |
| Lauroyl peroxide | 2.5 | was introduced. After 8 hours, the polymerization had been substantially completed and the graft copolymer appeared in the form of white beads which were washed with water and dried at 90° C. The determination of nitrogen shows that the grafted copolymer contains 22.5% of polymerized acrylonitrile. After the addition of 3% of methylene bis-stearamide by weight thereto, it was mixed at 170° C. in an internal Buss mixer, crushed and injection molded at 220° C. The moldings had a bright surface appearance. The properties measured on injection-molded test specimens at 23° C. are as follows:

Rockwell R hardness—110
Izod impact strength—17.4 kg.-cm./cm. of notch
Tensile strength at the yield point—508 bars
Ultimate tensile strength—387 bars
Ultimate percentage elongation—19%
Vicat 10/10 temperature—105° C.

EXAMPLE 3

This example relates to the production of copolymer outside the scope of this invention and is intended to demonstrate the improvement obtained by this invention.

Whilst operating as in Example 1, but replacing the mixture of monomers by 400 g. of ethyl acrylate only, an ethyl polyacrylate was produced which was employed to produce a graft copolymer in suspension according to the mode of operation of Example 2. The properties of the graft copolymer thus obtained measured at 23° C. are as follows:

Rockwell R hardness—103
Izod impact strength—2.5 kg.-cm./cm. of notch
Tensile strength at the yield point—245 bars
Ultimate tensile strength—249 bars
Ultimate percentage elongation—6%

This example thus shows that using a completely saturated polymeric substrate results in compositions which do not possess the high impact strength of the graft copolymers of the invention.

EXAMPLE 4

This example relates to the production in suspension of a graft copolymer by grafting styrene and acrylonitrile onto ethyl acrylate and tetrahydrobenzyl acrylate copolymer without isolating the elastomer from its latex.

Into the apparatus described in Example 2 the following solution was introduced:

Water—707 g.
Polyvinyl alcohol—5 g. (in the form of Rhodoviol 25/100 of Societe des Usines Chimiques Rhone Poulenc).

The solution was brought to 70° C. and de-aerated by means of bubbling nitrogen thereinto. The mixture obtained by successively adding the following reactants under violent stirring, was then fed in whilst stirring:

| | G. |
|---|---|
| Styrene | 138 |
| Acrylonitrile | 62 |
| Tertio dodecyl mercaptan | 0.4 |
| Lauroyl peroxide | 2 |
| Elastomer latex of Example 1 | 480 |
| 10% by weight solution of sodium chloride | 237 |

After 8 hours, the polymerisation had substantially been completed, and the graft copolymer appeared in the form of small flakes of 1 to 2 mm. in size which were washed with water and dried at 90° C. to obtain 370 g. of dry product.

In an internal Buss mixer heated at 170° C., 360 g. of this graft copolymer were mixed with 30 g. of methylene-bis-stearamide and 640 g. of a styrene-acrylonitrile resin having an intrinsic viscosity of 0.525 dl./g., and containing 26.9% of acrylonitrile in the polymerised form. Moldings possessing a very attractive surface appearance were obtained by injection molding at 220° C. of the resulting composition, on which the folowing mechanical properties were measured at 23° C.:

Rockwell R hardness—107
Izod impact strength—6.2 kg. cm./cm. of notch
Tensile strength at the yield point—460 bars
Ultimate tensile strength—411 bars
Ultimate percentage elongation—7%

EXAMPLE 5

This example relates to the production in an emulsion of a graft copolymer by grafting styrene-acrylonitrile onto ethyl acrylate tetrahydrobenzyl acrylate copolymer.

(A) Production of the copolymer substrate

The following solution was introduced into a flask of 1 litre kept at 60° C., surmounted by a cooler and two dropping funnels, equipped with a stirring mechanism, a temperature gauge and a nitrogen feed:

| | G. |
|---|---|
| Water | 180 |
| Potassium persulphate | 1 |

One of the dropping funnels were filled with the monomers (192 g. of ethyl acrylate and 8 g. of tetrahydrobenzyl acrylate) and the other with a solution of 0.1 g. of sodium lauryl sulphate in 100 g. of water. After nitrogen scavenging of the atmosphere of the flask, the monomers and the emulsifier solution were poured in simultaneously in 2 hours. Heating was continued for another 3 hours to complete the polymerisation. A very opaque latex was obtained after filtration.

(B) Production of the graft copolymer

The following reactants were introduced into a 2-liter flask kept at 90° C., surmounted by two dropping funnels and a cooler, equipped with a stirring mechanism, a temperature gauge and a nitrogen feed:

| | G. |
|---|---|
| Latex produced according to A | 144 |
| Water | 676 |
| Hydrated disodium phosphate | 1.2 |
| Hydrated monosodium phosphate | 4 |
| Sodium lauryl sulphate | 16 |
| Potassium persulphate | 3 |

One of the dropping funnels were filled with the following monomers

| | G. |
|---|---|
| Styrene | 234.4 |
| Acrylonitrile | 105.6 |
| Tertio dodecyl mercaptan | 0.4 | and the other with the following emulsifier and catalytic solution:

| | G. |
|---|---|
| Water | 240 |
| Sodium lauryl sulphate | 8 |
| Potassium persulphate | 3 |

After nitrogen scavenging of the atmosphere of the flask, the monomers and the emulsifier and catalyst solution were poured thereinto in 3 hours. Heating was continued for another 6 hours and the dispersion obtained was coagulated by means of a solution containing 1% of calcium chloride. The graft copolymer appeared in the form of a white powder. It was washed, stove-dried at 90° C. An addition of 3% of methylene bis-stearamide was mixed therewith at 170° C. in a Buss mixer, and was injection molded at 220° C.

Its mechanical properties measured at 23° C. are as follows:

Rockwell R hardness—112
Izod impact strength—8 kg. cm./cm. of notch
Tensile strength at the yield point—450 bars
Ultimate tensile strength—355 bars
Ultimate percentage elongation—32%

EXAMPLE 6

Preparation of the copolymer of ethyl acrylate and tetrahydrobenzyl acrylate in emulsion.

The copolymer was prepared from the following reactants:

| | G. |
|---|---|
| Ethyl acrylate | 376 |
| Tetrahydrobenzyl acrylate | 24 |
| Water | 560 |
| Sodium laurylsulfate | 4 |
| Monohydrated monosodium phosphate | 2 |
| Potassium persulphate | 0.24 |
| Sodium bisulfite | 0.12 |
| Heptahydrated ferrous sulfate | 0.016 |

345 cc. of water and the monosodium phosphate were introduced into a 2-litre flask kept at 20° C., surmounted by two dropping funnels and equipped with a stirring mechanism, a nitrogen feed and a temperature gauge. One of the dropping funnels was filled with the monomers, the other with a solution of 4 g. of sodium lauryl sulphate in 200 cc. of water. After scavenging of the flask with a flow of nitrogen, 30 cc. of the solution of lauryl sulfate was poured in, after which the persulfate, the bisulfite and the ferrous sulfate were fed thereinto in the form of freshly prepared solutions (5 cc. of each solution). Immediately thereafter, the monomers and the rest of the lauryl sulfate solution were poured in continuously and simultaneously at such a speed that the internal temperature of the flask, which was changed according to the reaction, was kept at 25° C. The pouring action lasted approximately one and a half hours and the flask was kept at 25° C. for another 3 hours. The yield of the polymerisation then was 98.5%. The copolymer was collected in the form of a latex of which a part was coagulated by means of a solution containing 0.5% by weight of calcium chloride. The copolymer thus isolated in the condition of white crumbs was washed and dried under reduced pressure at 60° C. Its intrinsic viscosity in benzene at 25° C. was 1.25 dl./g.

EXAMPLE 7

Preparation of a graft copolymer of methyl methacrylate on copolymer of ethyl acrylate and tetrahydrobenzyl acrylate in suspension without isolating the copolymer substrate from its latex.

The following solution was fed into a 2 liter glass reactor kept at 70° C., surmounted by a dropping funnel, a cooler, and equipped with a stirring mechanism and a nitrogen feed:

Water—707 g.
Polyvinyl alcohol—5 g.
(in the form of Rhodoviol 25/100 M of Societe des Usines Chimiques Rhone Poulenc).

The solution was brought to 70° C. and was deaerated by bubbling nitrogen thereinto. The mixture obtained by successively adding the following reactants under violent stirring, was then fed in under agitation.

| | G. |
|---|---|
| Methyl methacrylate | 194 |
| Ethyl acrylate | 6 |
| Tertio dodecyl mercaptan | 0.4 |
| Lauroyl peroxide | 2 |
| Elastomer latex of Example 1 | 480 |
| Solution with 10% of sodium chloride | 237 |

The polymerisation had been substantially completed after 8 hours, and the graft copolymer appeared in the form of small flakes of 1 to 2 mm. in size which were washed with water and dried at 90° C. to obtain 375 g. of dry product.

In an internal Buss mixer heated to 170° C., 360 g. of this graft copolymer were mixed with 3.6 g. of stearic alcohol and 540 g. of an injection methacrylic resin (Altulite DB of Sté. Altulor). By injection of 230° C. of the resulting composition, translucent moulding were obtained on which the following mechanical properties were measured at 23° C.:

Rockwell R hardness—116
Izod impact strength—6.8 kg. cm./cm. of notch
Tensile strength at the yield point—515 bars
Ultimate tensile strength—458 bars
Ultimate percentage elongation—14%

EXAMPLE 8 (COMPARATIVE EXAMPLE)

Whilst employing the process described in Example 1, but replacing the mixture of monomers with 400 g. of ethyl acrylate, a poly ethyl acrylate was produced which was employed to produce a graft copolymer according to Example 2.

The properties of the composition obtained, measured at 23° C., are as follows:

Rockwell R hardness—109
Izod impact strength—1.2 kg. cm/cm. of notch
Tensile strength at the yield point—481 bars
Ultimate tensile strength—412 bars
Ultimate percentage elongation—5%

EXAMPLE 9

Preparation of a graft copolymer of methyl methacrylate with an interpolymer of ethyl acrylate styrene and tetrahydrobenzyl acrylate.

(A) Preparation of the interpolymer

Into a 1 liter flask kept at 60° C., surmounted by a cooler and two dropping funnels, equipped with a stirring mechanism, a temperature gauge and a nitrogen feed, the following solution was fed:

| | G. |
|---|---|
| Water | 180 |
| Potassium persulphate | 1 |

One of the dropping funnels was filled with the following monomers: 162 g. of ethyl acrylate, 30 g. of styrene and 8 g. of tetrahydrobenzyl acrylate, and the other with a solution of 0.1 g. of sodium lauryl sulfate in 100 g. of water. After nitrogen scavenging of the atmosphere of the flask, the monomers and the solution of emulsifier were poured in simultaneously in 2 hours. Heating action was maintained for another 3 hours to complete the polymerisation. A very opaque latex was collected after filtration.

(B) Preparation of the graft copolymer

The following reactants were fed into a 2 liter flask kept at 80° C., surmounted by two dropping funnels and a cooler, equipped with a stirring mechanism, a temperature gauge and a nitrogen feed:

|   | G. |
|---|---|
| Latex | 144 |
| Water | 676 |
| Hydrated disodium phosphate | 1.2 |
| Hydrated monosodium phosphate | 4 |
| Sodium lauryl sulfate | 16 |
| Potassium persulfate | 3 |

One of the dropping funnels was filled with the following monomers:

|   | G. |
|---|---|
| Methyl methacrylate | 330 |
| Ethyl acrylate | 10 |
| Tertio dodecyl mercaptan | 0.4 | and the other with the following solution of emulsifier and catalyst:

|   | G. |
|---|---|
| Water | 240 |
| Sodium lauryl sulphate | 8 |
| Potassium persulphate | 3 |

After nitrogen scavenging of the atmosphere of the flask, the monomers and the solution of emulsifier and catalyst were poured thereinto in 3 hours. Heating was maintained for another 6 hours and the dispersion obtained was coagulated by means of a solution with 1% of calcium chloride. The graft copolymer appeared in the form of a white powder. It was washed, stovedried at 90° C. After 1% of stearic alcohol was mixed therewith at 170° C. in a Buss mixer, it was molded at 220° C. The moldings obtained offer satisfactory impact strength and are transparent.

We claim:
1. A graft copolymer comprising:
   (I) an interpolymeric chain forming substantially the backbone of said graft copolymer, which comprises
      (a) 80 to 99 parts by weight of at least one acrylic ester of a lower aliphatic alcohol having 1 to 8 carbon atoms polymerized with
      (b) 1 to 20 parts by weight of at least one ester having the following formula:

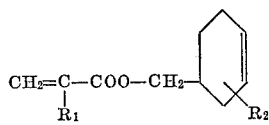

wherein $R_1$ and $R_2$ each is a hydrogen atom or a methyl group, in said interpolymeric chain the combination of (a) and (b) being 100 parts by weight; and
      (c) 0 to 30 parts by weight of one or more copolymerizable monomers; and
   (II) side polymeric chains grafted to said interpolymeric chain which comprises:
      (i) polymerized linkages of
         (d) 70 to 100 parts by weight of methyl methacrylate copolymerized with
         (e) 0 to 30 parts by weight of one or more copolymerizable monomers; or
      (ii) polymerized linkages of
         (f) 60 to 100 parts by weight of at least one vinylic aromatic monomer copolymerized with
         (g) 0 to 40 parts by weight of at least one ethylenic nitrile, the amount of (f) and (g) in the polymeric linkages (ii) being 100 parts by weight; and
         (h) 0 to 30 parts by weight of one or more copolymerizable monomers; and
the interpolymeric chain which forms the backbone of the graft copolymer being 5 to 75% by weight of the graft copolymer.

2. A graft copolymer according to claim 1 wherein (a) is at least one acrylic ester of methyl, ethyl, butyl, 2-ethyl hexyl or heptyl alcohol.

3. A graft copolymer according to claim 1 wherein (b) is at least one acrylic or methacrylic ester of tetrahydrobenzyl alcohol.

4. A graft copolymer according to claim 1 wherein (c) is selected from acrylonitrile, methacrylonitrile, methylene glutaronitrile, styrene, vinyl esters of saturated aliphatic acids having 1 to 18 carbon atoms, vinyl and alkyl ethers whose alkyl moiety contains 1 to 18 carbon atoms, allyl acrylate, allyl methacrylate and divinyl benzene.

5. A graft copolymer according to claim 1 wherein (e) is selected from styrene, α-methyl styrene, acrylonitrile, methacrylonitrile, methylene glutaronitrile, methyl acrylate and the acrylic and methacrylic esters of ethyl, butyl, 2-ethylhexyl, and heptyl alcohols.

6. A graft copolymer according to claim 1 wherein (f) is selected from styrene, α-methyl styrene, halogenated styrenes, and alkylated styrenes.

7. A graft copolymer according to claim 1 wherein (g) is selected from acrylonitrile, methacrylonitrile and methylene glutaronitrile.

8. A graft copolymer according to claim 1 wherein (h) is selected from acrylic and methacrylic esters of methyl, ethyl, butyl, 2-ethylhexyl, and heptyl alcohols.

9. A graft copolymer according to claim 2 wherein (b) is at least one acrylic or methacrylic ester of tetrahydrobenzyl alcohol.

10. A graft copolymer according to claim 9 wherein (c) is selected from acrylonitrile, methacrylonitrile, methylene glutaronitrile, styrene, vinyl esters of saturated aliphatic acids having 1 to 18 carbon atoms, vinyl and alkyl ethers whose alkyl moiety contains 1 to 18 carbon atoms, allyl acrylate, allyl methacrylate and divinyl benzene.

11. A graft copolymer according to claim 10 wherein (e) is selected from styrene, α-methyl styrene, acrylonitrile, methacrylonitrile, methylene glutaronitrile, methyl acrylate, and the acrylic and methacrylic esters of ethyl, butyl, 2-ethylhexyl, and heptyl alcohols.

12. A graft copolymer according to claim 10 wherein (f) is selected from styrene, α-methyl styrene, halogenated styrene and alkylated styrenes.

13. A graft copolymer according to claim 12 wherein (g) is selected from acrylonitrile, methacrylonitrile, and methylene glutaronitrile.

14. A graft copolymer according to claim 13 wherein (h) is selected from acrylic and methacrylic esters of methyl, ethyl, butyl, 2-ethylhexyl and heptyl alcohols.

15. A method of producing the graft copolymer of claim 1 which comprises emulsion polymerization to graft (II) to (I) at a temperature between 0° and 100° C. and at a pH in the range of 2 to 10.

References Cited

UNITED STATES PATENTS 2,992,203    7/1961    Protzman    260—885

FOREIGN PATENTS 1,511,011    12/1967    France.

SAMUEL H. BLECH, Primary Examiner

R. J. SEIBERT, Assistant Examiner

U.S. Cl. X.R.

260—29.6, 29.7, 80.81, 86.1, 876, 885